(12) United States Patent
Yoshida et al.

(10) Patent No.: US 8,209,954 B2
(45) Date of Patent: Jul. 3, 2012

(54) EXHAUST PURIFICATION DEVICE OF AN INTERNAL COMBUSTION ENGINE

(75) Inventors: Kohei Yoshida, Gotenba (JP);
Takamitsu Asanuma, Mishima (JP);
Hiromasa Nishioka, Susono (JP);
Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 343 days.

(21) Appl. No.: 12/450,231

(22) PCT Filed: Aug. 26, 2008

(86) PCT No.: PCT/JP2008/065626
§ 371 (c)(1),
(2), (4) Date: Sep. 17, 2009

(87) PCT Pub. No.: WO2009/031483
PCT Pub. Date: Mar. 12, 2009

(65) Prior Publication Data
US 2010/0071347 A1    Mar. 25, 2010

(30) Foreign Application Priority Data
Sep. 5, 2007   (JP) .................................. 2007-230539

(51) Int. Cl.
*F01N 3/00* (2006.01)
(52) U.S. Cl. ................. 60/285; 60/295; 60/301
(58) Field of Classification Search .............. 60/285, 60/286, 295, 301
See application file for complete search history.

(56) References Cited

U.S. PATENT DOCUMENTS

| | | | | | |
|---|---|---|---|---|---|
| 5,778,667 | A | * | 7/1998 | Kinugasa et al. | 60/274 |
| 5,782,087 | A | * | 7/1998 | Kinugasa et al. | 60/276 |
| 5,964,088 | A | * | 10/1999 | Kinugasa et al. | 60/286 |
| 5,974,793 | A | * | 11/1999 | Kinugasa et al. | 60/285 |
| 6,047,542 | A | * | 4/2000 | Kinugasa et al. | 60/274 |
| 6,109,024 | A | * | 8/2000 | Kinugasa et al. | 60/285 |
| 6,119,452 | A | * | 9/2000 | Kinugasa et al. | 60/285 |

(Continued)

FOREIGN PATENT DOCUMENTS
EP   1 435 437 A1   7/2004
(Continued)

OTHER PUBLICATIONS

Supplementary European Search Report for corresponding European Patent Application No. 08792808.1, mailed on Jan. 26, 2011.

*Primary Examiner* — Thomas Denion
*Assistant Examiner* — Patrick Maines
(74) *Attorney, Agent, or Firm* — Oliff & Berridge, PLC

(57) ABSTRACT

An internal combustion engine wherein an $NO_x$ storing catalyst is arranged in an engine exhaust passage and an $NO_x$ selective reducing catalyst is arranged downstream of the $NO_x$ storing catalyst. Just before the air-fuel ratio of the exhaust gas flowing into the $NO_x$ storing catalyst is temporarily switched from lean to rich to release $NO_x$ from the $NO_x$ storing catalyst, an amount of $NO_x$ necessary for removing ammonia adsorbed on the $NO_x$ selective reducing catalyst is fed to the $NO_x$ selective reducing catalyst under a lean air-fuel ratio.

8 Claims, 13 Drawing Sheets

U.S. PATENT DOCUMENTS

| | | | |
|---|---|---|---|
| 6,176,079 B1 * | 1/2001 | Konrad et al. | 60/274 |
| 6,182,443 B1 * | 2/2001 | Jarvis et al. | 60/274 |
| 6,345,496 B1 * | 2/2002 | Fuwa et al. | 60/274 |
| 6,732,507 B1 | 5/2004 | Stanglmaier et al. | |
| 7,063,642 B1 | 6/2006 | Hu et al. | |
| 2006/0010857 A1 * | 1/2006 | Hu et al. | 60/286 |
| 2007/0033928 A1 * | 2/2007 | Hu et al. | 60/286 |
| 2007/0175208 A1 * | 8/2007 | Bandl-Konrad et al. | 60/286 |

FOREIGN PATENT DOCUMENTS

| | | |
|---|---|---|
| JP | A-11-30117 | 2/1999 |
| JP | 2000-27634 | 1/2000 |
| JP | 2003-65036 | 3/2003 |
| JP | 2004-211679 | 7/2004 |
| WO | WO 2006/008625 A1 | 1/2006 |
| WO | WO 2007/042904 A2 | 4/2007 |

\* cited by examiner

Fig.2
(A)
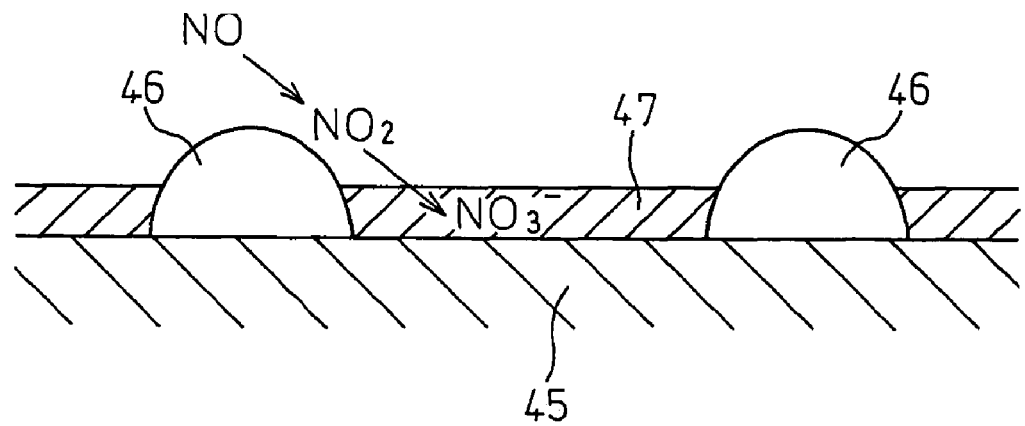
(B)
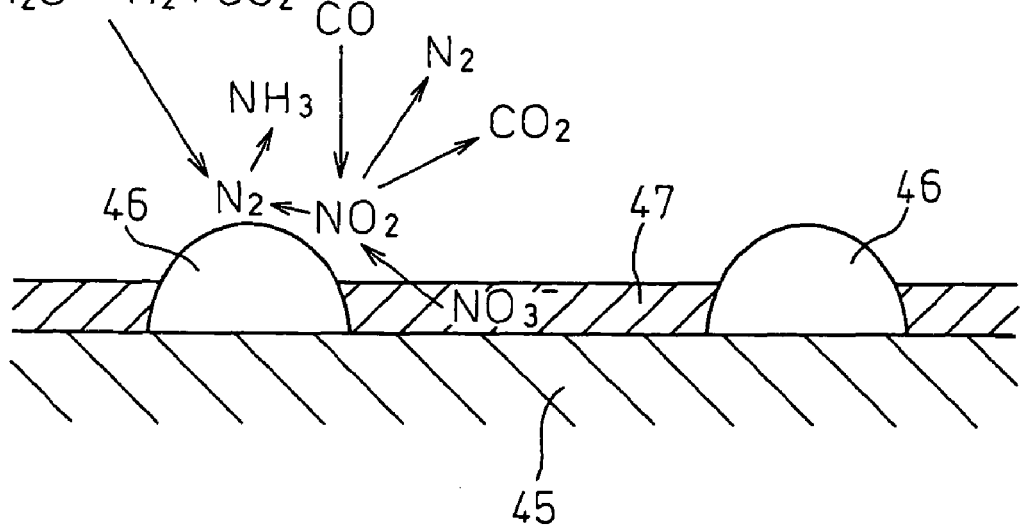

Fig. 4
(A)
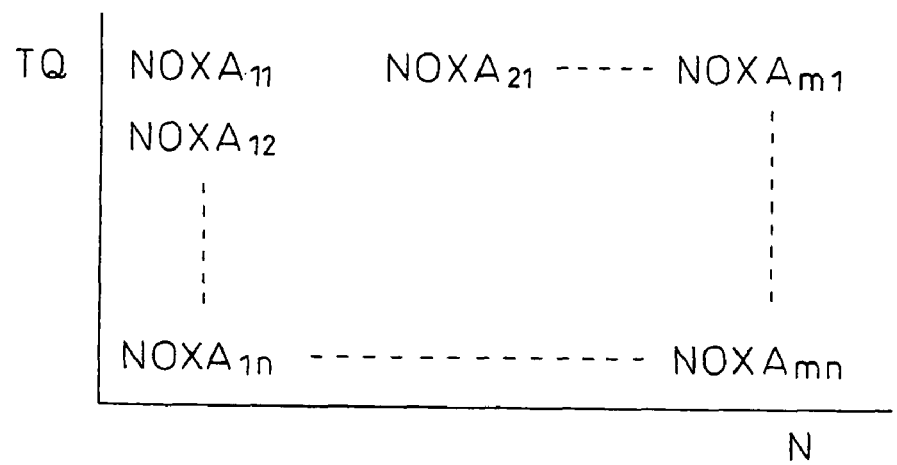
(B)
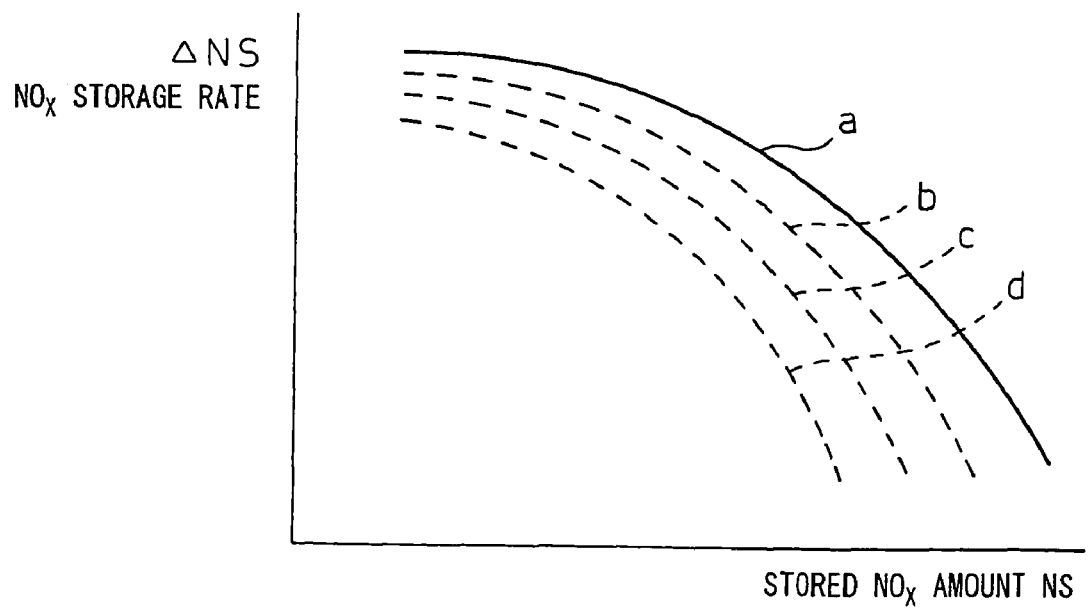

Fig.5
(A)
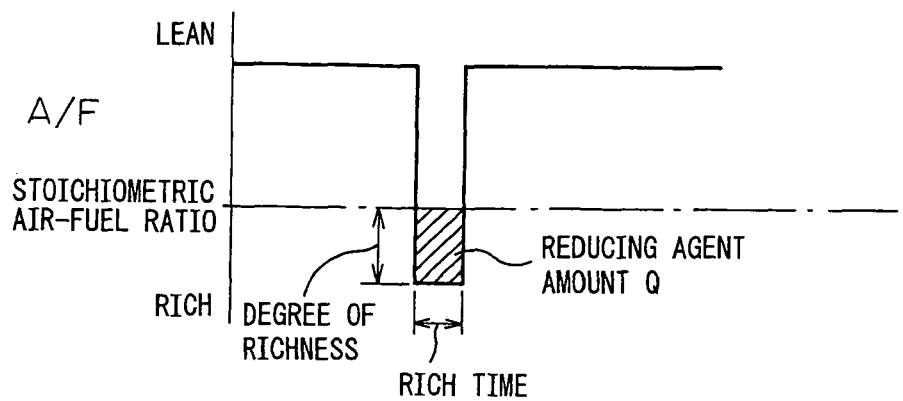
(B)
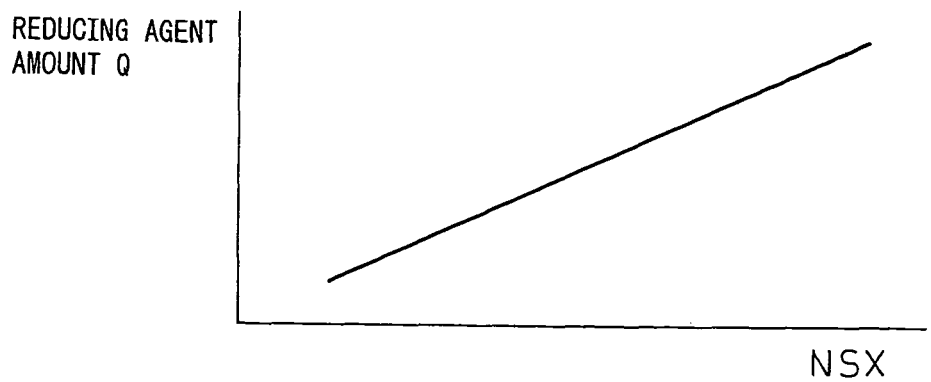
(C)
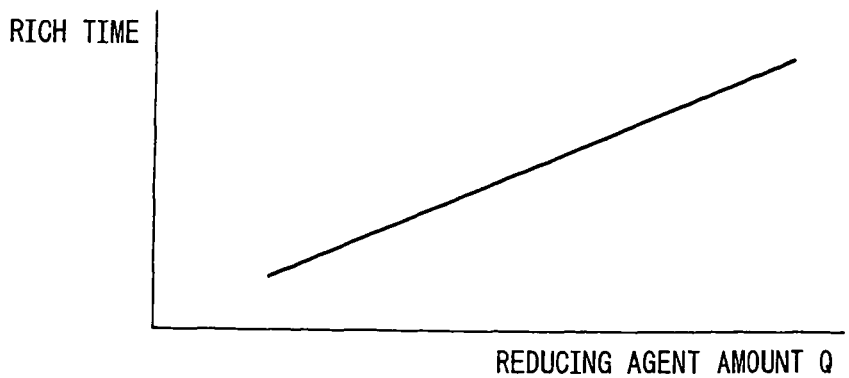

Fig. 6
(A)
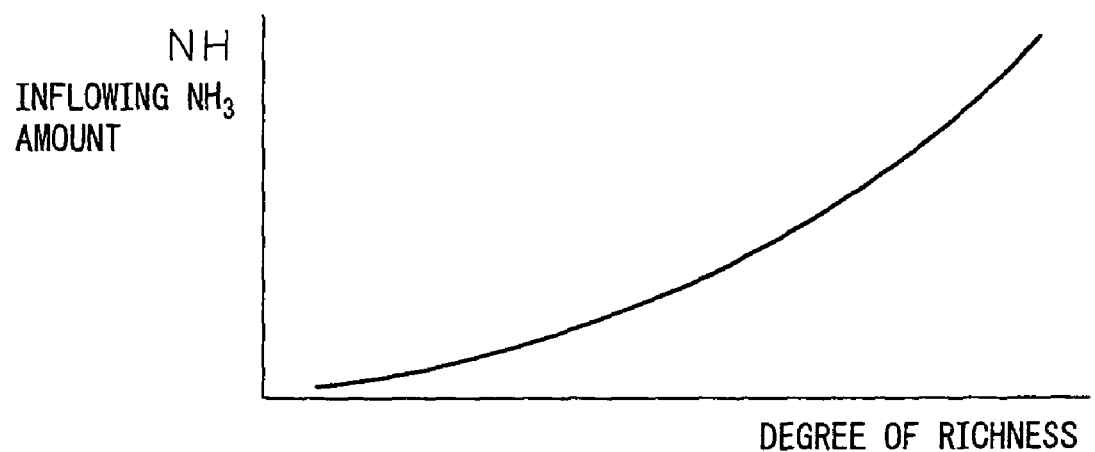
(B)
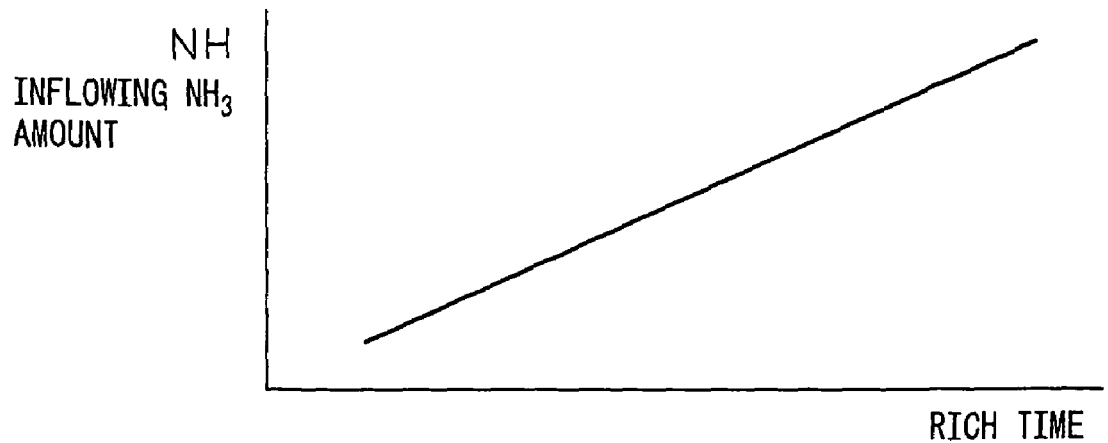

Fig.8
(A)
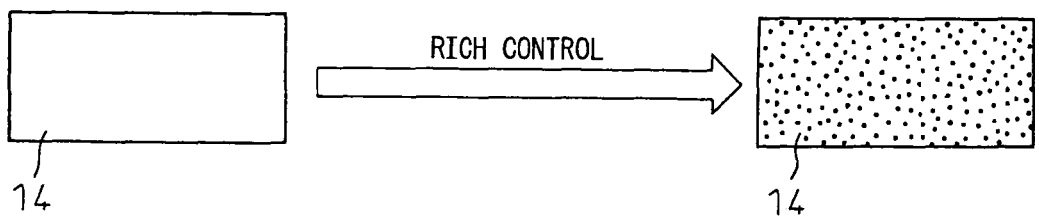
(B)
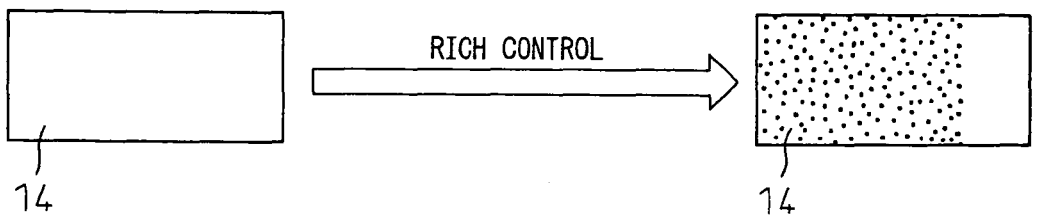
(C)
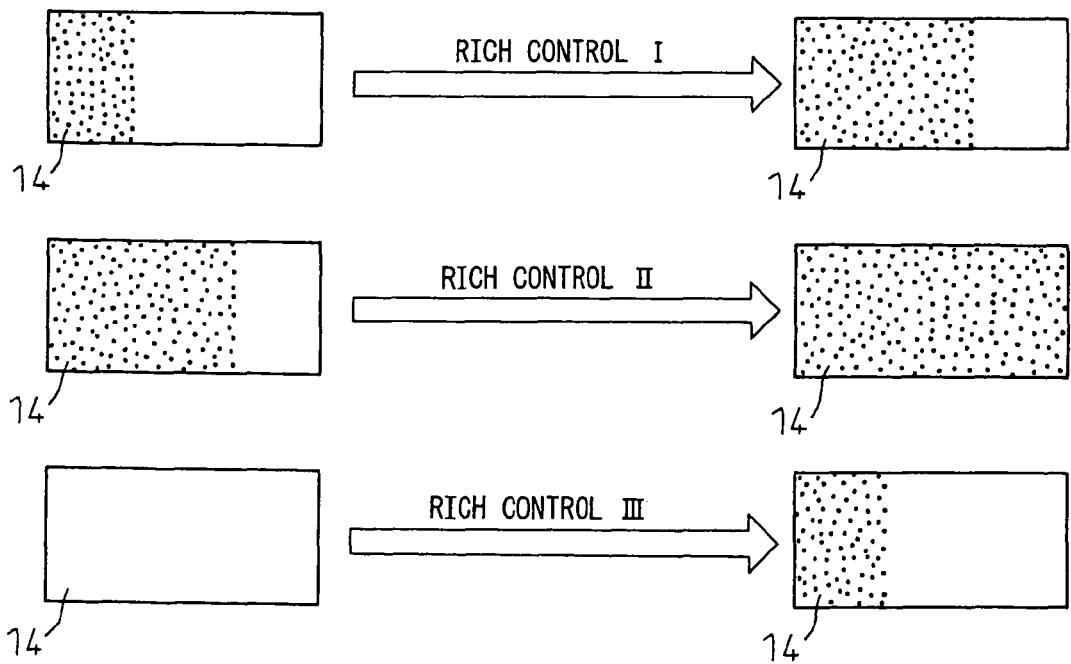

Fig.9
(A)
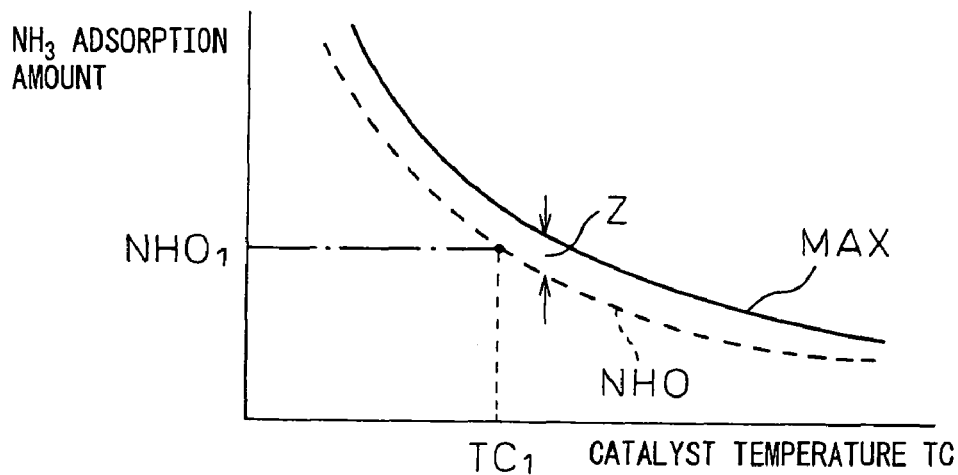
(B)
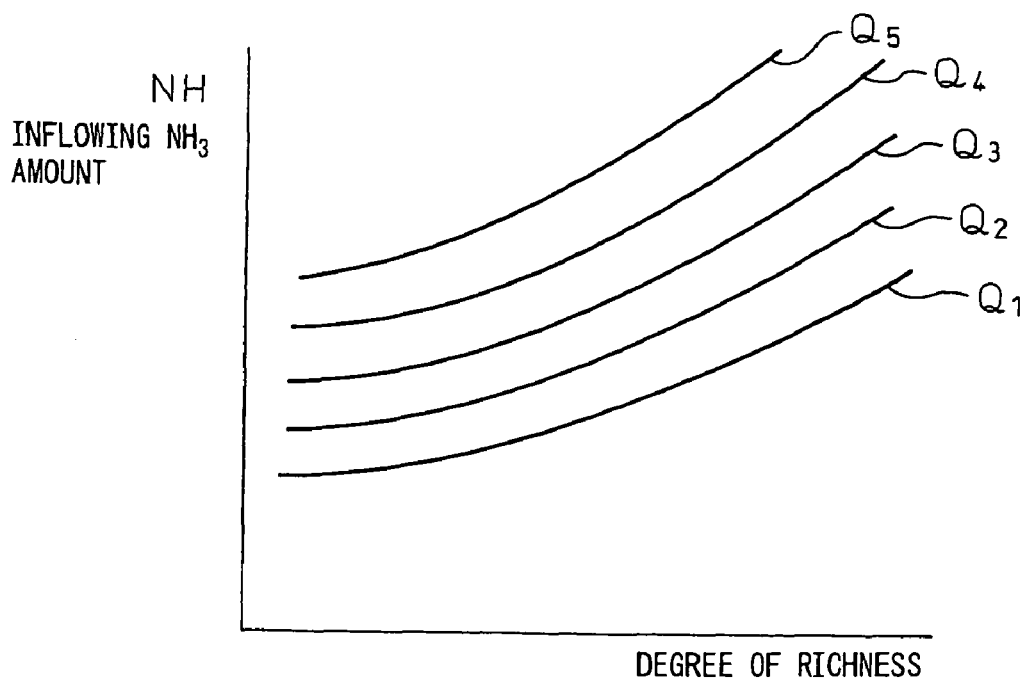

Fig. 13
(A)
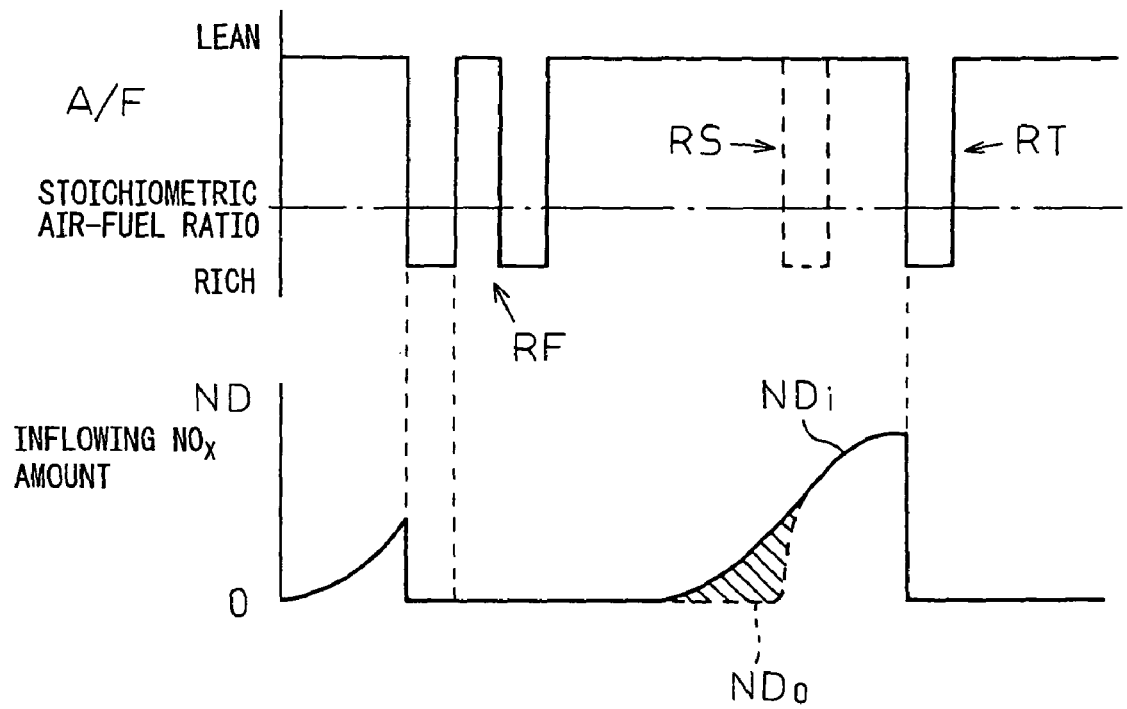
(B)
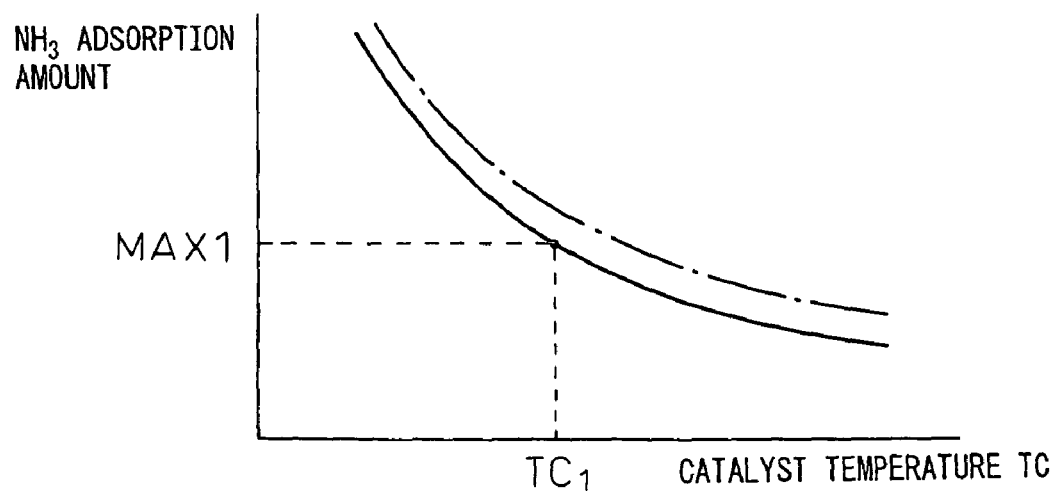

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_x$ storing catalyst which stores $NO_x$ contained in exhaust gas when the air-fuel ratio of the inflowing exhaust gas is lean and releases stored $NO_x$ when the air-fuel ratio of the inflowing exhaust gas is a stoichiometric air-fuel ratio or rich, arranging downstream of the $NO_x$ storing catalyst an $NO_x$ selective reducing catalyst capable of selectively reducing the $NO_x$ in the exhaust gas with adsorbed ammonia, arranging upstream of the $NO_x$ storing catalyst a three-way catalyst, and temporarily switching the air-fuel ratio of the exhaust gas flowing into the three-way catalyst from lean to rich to release $NO_x$ from the $NO_x$ storing catalyst (see Japanese Patent Publication (A) No. 11-30117).

In this internal combustion engine, when the air-fuel ratio of the exhaust gas is temporarily switched from lean to rich to release $NO_x$ from the $NO_x$ storing catalyst, there are cases of a comparatively large amount of ammonia being generated at the three-way catalyst, and the ammonia not used for the reduction of the $NO_x$ at the $NO_x$ storing catalyst at this time flowing out from the $NO_x$ storing catalyst. In this case, the ammonia flowing out from the $NO_x$ storing catalyst is adsorbed on the $NO_x$ selective reducing catalyst.

On the other hand, in this internal combustion engine, there are cases of a slight amount of $NO_x$ not stored at the $NO_x$ storing catalyst flowing out from the $NO_x$ storing catalyst during normal operation wherein the exhaust gas is maintained at a lean air-fuel ratio. However, in this internal combustion engine, when $NO_x$ flows out from the $NO_x$ storing catalyst in this way, this $NO_x$ is reduced by the ammonia adsorbed on the $NO_x$ selective reducing catalyst. From another angle, the ammonia adsorbed on the $NO_x$ selective reducing catalyst is consumed to reduce the $NO_x$ and thereby removed from the $NO_x$ selective reducing catalyst.

However, in this internal combustion engine, the outflow of $NO_x$ from the $NO_x$ storing catalyst occurs in the general course of things. Accordingly, if a state of $NO_x$ not flowing out from the $NO_x$ storing catalyst continues, the ammonia adsorbed on the $NO_x$ selective reducing catalyst continues to be adsorbed on the $NO_x$ selective reducing catalyst without reacting with the $NO_x$ and being removed. As a result, the amount of adsorbed ammonia of the $NO_x$ selective reducing catalyst becomes saturated, therefore causing the problem of the ammonia generated each time the air-fuel ratio of the exhaust gas is made rich passing straight through the $NO_x$ selective reducing catalyst and being exhausted into the atmosphere.

DISCLOSURE OF THE INVENTION

An object of the present invention is to provide an exhaust purification device of an internal combustion engine capable of maintaining an $NO_x$ selective reducing catalyst at a state where it is able to adsorb ammonia at all times.

According to the present invention, there is provided an exhaust purification device of an internal combustion engine arranging in an engine exhaust passage an $NO_x$ storing catalyst which stores $NO_x$ contained in exhaust gas when an air-fuel ratio of an inflowing exhaust gas is lean and releases stored $NO_x$ when the air-fuel ratio of the inflowing exhaust gas is a stoichiometric air-fuel ratio or rich, and arranging in the engine exhaust passage downstream of the $NO_x$ storing catalyst downstream an $NO_x$ selective reducing catalyst capable of selectively reducing $NO_x$ in the exhaust gas with adsorbed ammonia, the air-fuel ratio of the exhaust gas flowing into the $NO_x$ storing catalyst being temporarily switched from lean to rich to release $NO_x$ from the $NO_x$ storing catalyst, wherein, just before the air-fuel ratio of the exhaust gas flowing into the $NO_x$ storing catalyst is temporarily switched from lean to rich to release $NO_x$ from the $NO_x$ storing catalyst, ammonia removal control for removing the ammonia adsorbed on the $NO_x$ selective reducing catalyst is executed.

In the present invention, the ammonia adsorbed on the $NO_x$ selective reducing catalyst is not removed in the general course of things, but removal control of ammonia is executed at predetermined periods, whereby the $NO_x$ selective reducing catalyst is maintained at a state where ammonia is able to be adsorbed at all times.

BRIEF DESCRIPTION OF THE DRAWINGS

FIGS. 2A and 2B are cross-sectional views of a surface portion of an $NO_x$ storing catalyst, FIG. 4A is a view showing a map of a stored $NO_x$ amount NOXA, FIG. 4B shows the relationship between $NO_x$ storage rate and $NO_x$ stored amount for different levels of catalyst degradation, FIGS. 5A-5C are views showing the amount of reducing agent during rich processing, FIGS. 6A and 6B are views showing an inflowing ammonia amount of an $NO_x$ selective reducing catalyst, FIGS. 8A - 8C are views for explaining methods of removing adsorbed ammonia, FIG. 9A is a view showing an ammonia saturated adsorption amount of an $NO_x$ selective reducing catalyst, FIG. 9B shows a relationship between reducing agent amount and degree of richness for a plurality of reducing agent amounts, FIGS. 13A and 13B are views for explaining rich processing etc. for checking a saturated adsorption amount of ammonia.

BEST MODE FOR CARRYING OUT THE INVENTION

Figure 1:
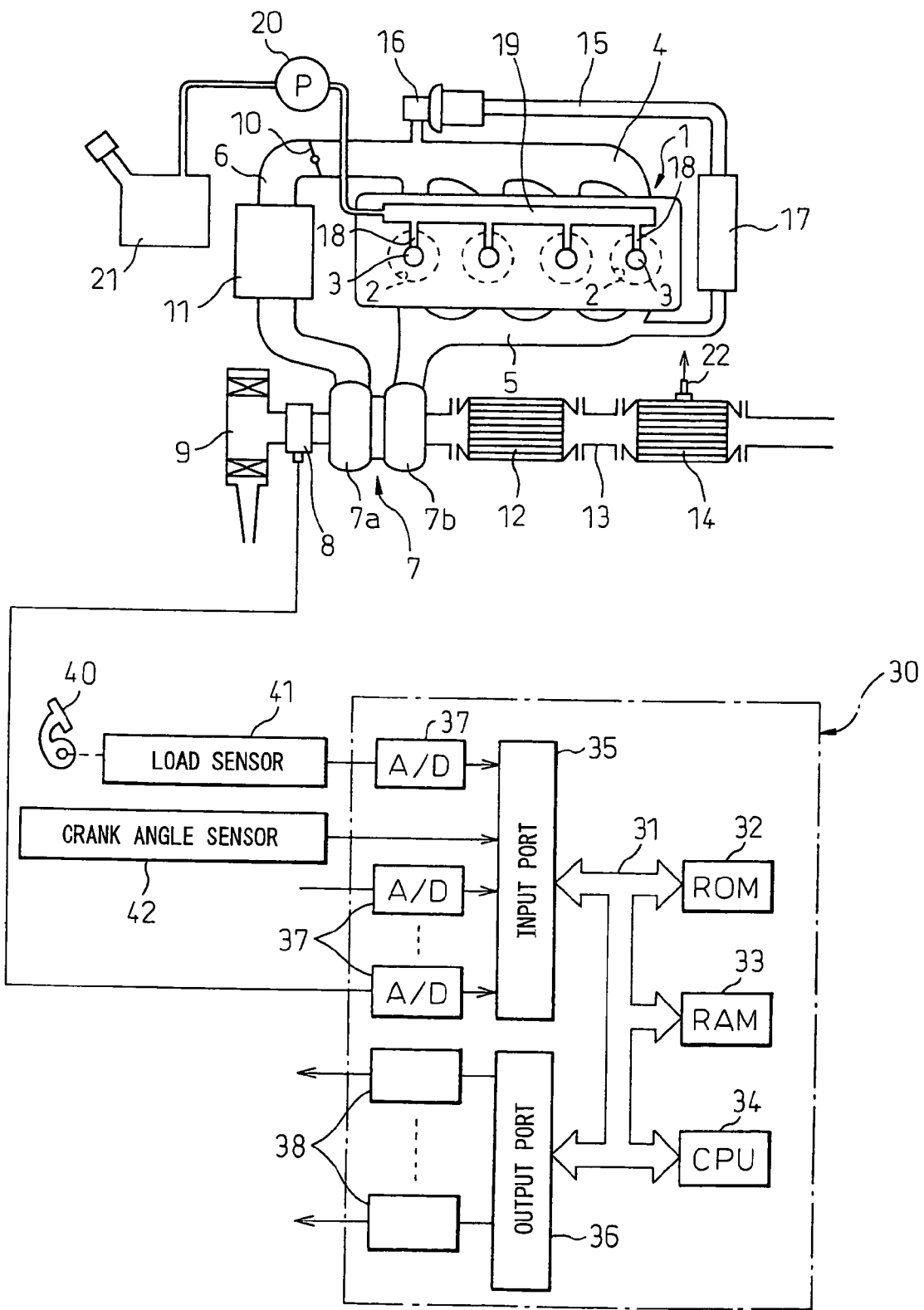
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected to an air cleaner 9 via an intake air amount detector 8. Inside the intake duct 6 is arranged a throttle valve 10 driven by a step motor. Further, around the intake duct 6 is arranged a cooling device 11 for cooling the intake air flowing through the inside of the intake duct 6. In the embodiment shown in FIG. 1, the engine cooling water is guided into the cooling device 11. The engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of an $NO_x$ storing catalyst 12. The outlet of the $NO_x$ storing catalyst 12 is connected via an exhaust pipe 13 to an $NO_x$ selective reducing catalyst 14 able to selectively reduce the $NO_x$ in the exhaust gas by an ammonia when the air-fuel ratio of the exhaust gas is lean. This $NO_x$ selective reducing catalyst 14 is formed by for example ammonia absorption type Fe zealite.

The exhaust manifold 5 and the intake manifold 4 are interconnected through an exhaust gas recirculation (hereinafter referred to as an "EGR") passage 15, and an electronically controlled EGR control valve 16 is arranged in the EGR passage 15. Further, around the EGR passage 15 is arranged a cooling device 17 for cooling the EGR gas flowing through the inside of the EGR passage 15. In the embodiment shown in FIG. 1, the engine cooling water is guided into the cooling device 17. The engine cooling water cools the EGR gas. On the other hand, each fuel injector 3 is connected through a fuel feed tube 18 to a common rail 19. This common rail 19 is connected to a fuel tank 21 via an electronically controlled variable discharge fuel pump 20. Fuel stored in the fuel tank 21 is supplied to the common rail 19 by the fuel pump 20 and the fuel supplied into the common rail 19 is supplied through each fuel feed tube 18 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31.

A temperature sensor 22 for detecting the temperature of the $NO_x$ selective reducing catalyst 14 is attached to the $NO_x$ selective reducing catalyst 14, and the output signals of the temperature sensor 22 and the intake air amount detector 8 are input through corresponding AD converters 37 to the input port 35. Further, an accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, the step motor for driving the throttle valve 10, EGR control valve 16, and fuel pump 20.

First, explaining the $NO_x$ storing catalyst 12 shown in FIG. 1, a catalyst carrier comprised of for example alumina is carried on the $NO_x$ storing catalyst 12, and FIGS. 2(A), (B) schematically show the cross-section of the surface part of this catalyst carrier 45. As shown in FIGS. 2(A), (B), the catalyst carrier 45 carries a precious metal catalyst 46 diffused on its surface. Further, the catalyst carrier 45 is formed with a layer of an $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth is used.

If the ratio of the air and fuel (hydrocarbons) supplied to the engine intake passage, combustion chambers 2, and exhaust passage upstream of the $NO_x$ storing catalyst 12 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 2(A) to become $NO_2$, then is absorbed in the $NO_x$ absorbent 47 and diffuses in the $NO_x$ absorbent 47 in the form of nitric acid ions $NO_3^-$ while bonding with the barium carbonate $BaCO_3$. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

As opposed to this, if the air-fuel ratio of air fuel mixture in the combustion chamber 2 is made rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$, as shown in FIG. 2(B). Next, the released $NO_x$ is reduced by the unburned hydrocarbons or CO included in the exhaust gas. For example, when the released $NO_x$ is reduced by CO, the released $NO_x$ becomes $N_2$ and $CO_2$, as shown in FIG. 2(B).

In this way, when the air-fuel ratio of the exhaust gas is lean, that is, when burning fuel under a lean air-fuel ratio, the $NO_x$ in the exhaust gas is absorbed in the $NO_x$ absorbent 47. However, if continuing to burn fuel under a lean air-fuel ratio, during that time the $NO_x$ absorbing capability of the $NO_x$ absorbent 47 will end up becoming saturated and therefore $NO_x$ will end up no longer being able to be absorbed by the $NO_x$ absorbent 47. Therefore, in this embodiment according to the present invention, before the absorbing capability of the $NO_x$ absorbent 47 becomes saturated, the air-fuel ratio of the exhaust gas is temporarily made rich and thereby release the $NO_x$ from the $NO_x$ absorbent 47.

In this regard, if the air-fuel ratio of the exhaust gas is made rich to release $NO_x$ from the $NO_x$ absorbent 47, as shown in FIG. 2(B), a portion of the CO reacts with the water $H_2O$ contained in the exhaust gas to produce $H_2$. Next, this $H_2$ reacts with the $N_2$ produced from the $NO_2$ released from the $NO_x$ absorbent 47 and produces ammonia $NH_3$. That is, if the exhaust gas is made rich to release $NO_x$ from the $NO_x$ absorbent 47, ammonia $NH_3$ is produced at the $NO_x$ storing catalyst 12. This ammonia $NH_3$ flows out from the $NO_x$ storing catalyst 12 and is adsorbed on the $NO_x$ selective reducing catalyst 14.

If leaving this state as it is, the adsorbed ammonia amount of the $NO_x$ selective reducing catalyst 14 will become saturated. This creates the problem of the ammonia generated each time the air-fuel ratio of the exhaust gas is made rich ending up passing straight through the $NO_x$ selective reducing catalyst 14. Therefore, in the present invention, to prevent the occurrence of such a problem, just before the air-fuel ratio of the exhaust gas flowing into the $NO_x$ storing catalyst 12 being temporarily switched from lean to rich to release $NO_x$ from the $NO_x$ storing catalyst 12, ammonia removal control for removing the ammonia adsorbed on the $NO_x$ selective reducing catalyst 14 is executed.

Somewhat more specifically, in the embodiment according to the present invention, $NO_x$ flows out from the $NO_x$ storing catalyst 12 just before the air-fuel ratio of the exhaust gas becomes rich. This $NO_x$ removes ammonia adsorbed on the $NO_x$ selective reducing catalyst 14. That is, in the embodiment according to the present invention, the above ammonia removal control comprises an ammonia removing $NO_x$ feed control which feeds the amount of $NO_x$ that is necessary to remove ammonia adsorbed on the $NO_x$ selective reducing catalyst 14 to the $NO_x$ selective reducing catalyst 14 while the air-fuel ratio of the exhaust gas is made lean.

Figure 3:
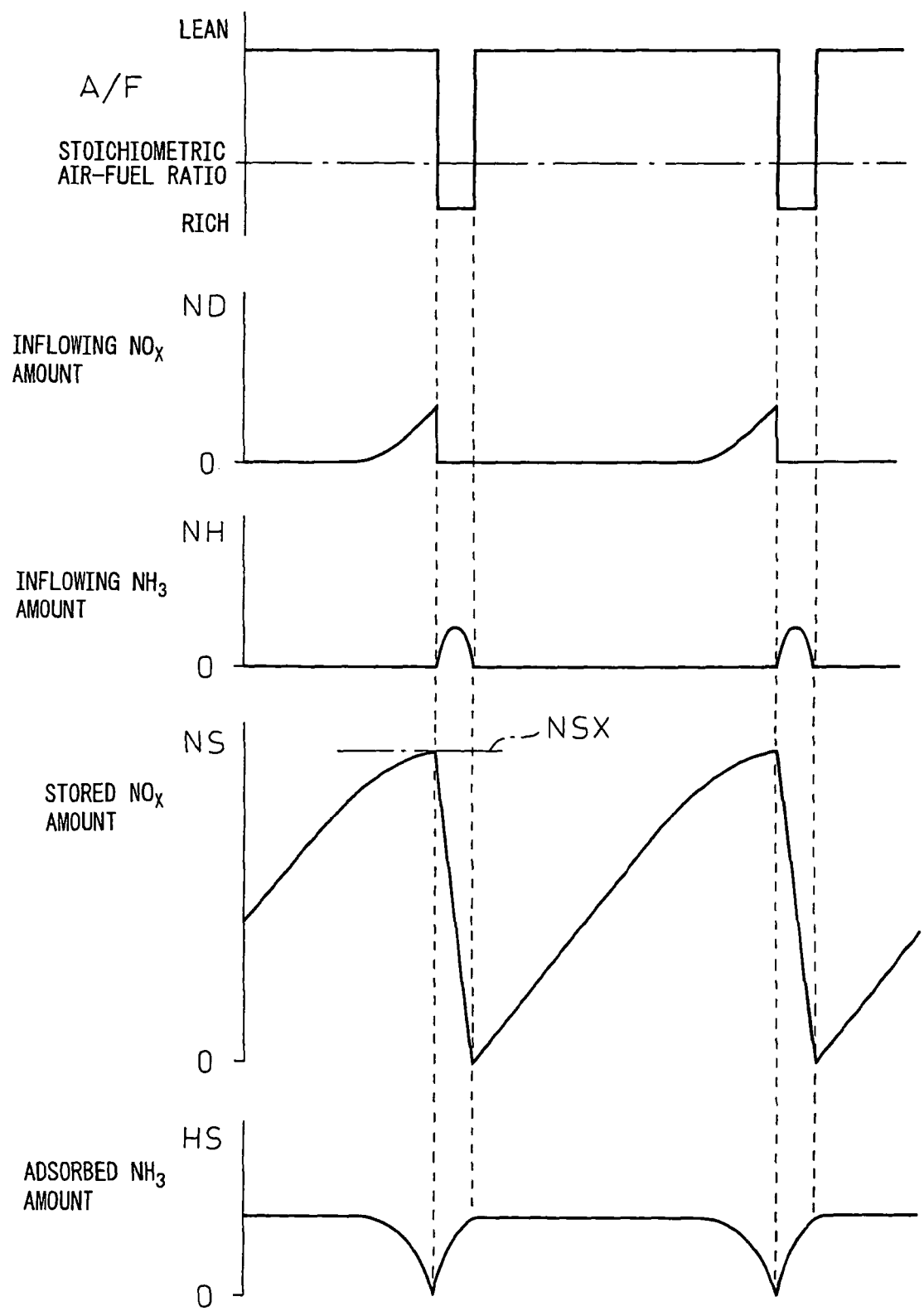
FIG. 3 is a time chart of ammonia removing $NO_x$ feed control.

FIG. 3 shows a time chart of this ammonia removing $NO_x$ feed control. Note that, in FIG. 3, A/F indicates the air-fuel ratio of the exhaust gas, ND the amount of $NO_x$ flowing out from the $NO_x$ storing catalyst 12, that is, the amount of the inflowing $NO_x$ flowing into the $NO_x$ selective reducing catalyst 14, NH the amount of ammonia flowing out from the $NO_x$ storing catalyst 12, that is, the amount of inflowing ammonia flowing into the $NO_x$ selective reducing catalyst 14, NS the amount of stored $NO_x$ stored in the $NO_x$ storing catalyst 12, and HS the amount of adsorbed ammonia absorbed on the $NO_x$ selective reducing catalyst 14.

As shown in FIG. 3, if the air-fuel ratio A/F of the exhaust gas is switched from lean to rich, $NO_x$ is released from the $NO_x$ storing catalyst 12 and, accordingly, the stored $NO_x$ amount NS drops rapidly. On the other hand, at this time, because ammonia is produced at the $NO_x$ storing catalyst 12, the inflowing ammonia amount NH flowing into the $NO_x$ selective reducing catalyst 14 increases temporarily and, as a result, the adsorbed ammonia amount HS of the $NO_x$ selective reducing catalyst 14 increases. That is, in FIG. 3, NSX indicates the stored $NO_x$ amount NS when the air-fuel ratio A/F of the exhaust gas is switched to rich.

Next, if the air-fuel ratio A/F of the exhaust gas is returned from rich to lean one once again, for some time after, the inflowing $NO_x$ amount will be near zero. That is, almost all the $NO_x$ contained in the exhaust gas is stored in the $NO_x$ storing catalyst 12. Further, in this period, ammonia is not generated at the $NO_x$ storing catalyst 12, accordingly, the inflowing ammonia amount NH is zero.

Next, if the $NO_x$ storage ability of the $NO_x$ storing catalyst 12 approaches saturation, the $NO_x$ storing catalyst 12 will become unable to store all of the $NO_x$ contained in the exhaust gas, and a portion of the $NO_x$ contained in the exhaust gas will pass straight through the $NO_x$ storing catalyst 12. The amount of this $NO_x$ that passes through increases over time, and as a result, the inflowing $NO_x$ amount ND of the $NO_x$ selective reducing catalyst 14 increases over time. The ammonia adsorbed on the $NO_x$ selective reducing catalyst 14 is consumed to reduce this inflowing $NO_x$, whereby the adsorbed ammonia amount HS decreases over time.

As shown in FIG. 3, in the embodiment according to the present invention, the $NO_x$ passes straight through the $NO_x$ storing catalyst 12 until the adsorbed ammonia amount HS is zero. When the adsorbed ammonia amount HS is zero, the air-fuel ratio A/F of the exhaust gas is switched from lean to rich, whereby $NO_x$ ceases passing straight through the catalyst. That is, in the embodiment according to the present invention, when the amount of $NO_x$ passing straight through the $NO_x$ storing catalyst 12 becomes the amount necessary for removing ammonia adsorbed on the $NO_x$ selective reducing catalyst 14 under a lean air-fuel ratio of the exhaust gas, the air-fuel ratio of the exhaust gas is temporarily switched from lean to rich.

Next, referring to FIGS. 4 to 8, a first embodiment according to the present invention will be explained.

In this first embodiment, there is provided an adsorbed ammonia amount estimating means for estimating an ammonia amount HS adsorbed on the $NO_x$ selective reducing catalyst 14. The $NO_x$ necessary for removing all or a portion of the amount of adsorbed ammonia estimated by this adsorbed ammonia amount estimating means is fed to the $NO_x$ selective reducing catalyst 14 under a lean air-fuel ratio of the exhaust gas.

In this case, in this first embodiment, the above adsorbed ammonia amount estimating means estimates the amount of adsorbed ammonia based on the degree of richness and rich time when the air-fuel ratio of the exhaust gas is made rich to release $NO_x$ from the $NO_x$ storing catalyst 12.

In this first embodiment, the pass-through amount of the $NO_x$ in the $NO_x$ storing catalyst 12 is calculated from the $NO_x$ amount exhausted per unit time from the engine and the $NO_x$ amount that the $NO_x$ storing catalyst 12 is able to store per unit time, that is, the $NO_x$ storage rate. That is, in this first embodiment, the $NO_x$ amount NOXA exhausted per unit time from the engine is stored as a function of the required torque TQ and engine speed N of the engine in the form of a map as shown in FIG. 4(A) in advance in the ROM 32.

On the other hand, the $NO_x$ storage rate ΔNS of the $NO_x$ storing catalyst 12 is a function of the stored $NO_x$ amount NS of the $NO_x$ storing catalyst 12. As shown in FIG. 4(B), the NOX storage rate ΔNS falls as the stored $NO_x$ amount NS rises. Note that, at the FIG. 4(B), a, b, c, and d show cases of differing degrees of degradation of the $NO_x$ storing catalyst 12, wherein the relationship of these degrees of degradation is d>c>b>a. That is, the higher the degree of degradation, the more the $NO_x$ storage rate ΔNS drops. The relationship shown in FIG. 4(B) is stored in advance in the ROM 32.

When the $NO_x$ storage rate ΔNS is higher in comparison to the exhausted $NO_x$ amount NOXA from the engine, all of the NOX exhausted from the engine is stored in the $NO_x$ storing catalyst 12. As opposed to this, when the $NO_x$ storage rate ΔNS is lower in comparison to the $NO_x$ amount NOXA exhausted from the engine, only the amount of $NO_x$ corresponding to the $NO_x$ storage rate ΔNS in the $NO_x$ exhausted from the engine is stored in the $NO_x$ storing catalyst 12, while the remaining $NO_x$ (=NOXA−ΔNS) passes straight through the $NO_x$ storing catalyst 12. By this, the amount of $NO_x$ passing straight through can be calculated from the $NO_x$ amount NOXA exhausted from the engine and the $NO_x$ storage rate ΔNS.

On the other hand, when additional fuel is fed and the air-fuel ratio of the exhaust gas is made rich, a portion of this additional fuel is used to consume the oxygen in the exhaust gas and lower the air-fuel ratio from lean to the stoichiometric air-fuel ratio, whereas a small portion of the remaining additional fuel is used to produce ammonia, while the majority, that is, the portion shown by the shaded region in FIG. 5(A) is used as a reducing agent for reducing the $NO_x$ released from the $NO_x$ storing catalyst 12. Accordingly, the amount Q of the reducing agent shown by the shaded region in FIG. 5(A) is determined from the stored $NO_x$ amount NSX (FIG. 3) of when the air-fuel ratio of the exhaust gas is made rich. As shown in FIG. 5(B), the amount Q of the reducing agent is proportional to the stored $NO_x$ amount NSX.

Changing the amount Q of the reducing agent requires changing either the degree of richness and the rich time shown in FIG. 5(A) or both. The first embodiment changes the rich time while maintaining the degree of richness constant so as to change the amount Q of the reducing agent. Accordingly, in the first embodiment, as shown in FIG. 5(C), the rich time changes in proportion to the amount Q of the reducing agent.

FIGS. 6(A) and (B) show the relationship of the inflowing ammonia amount NH that is produced at the $NO_x$ storing catalyst 12 and flows into the $NO_x$ selective reducing catalyst 14 and the degree of richness and rich time shown in FIG. 5(A). As shown in FIG. 6(A), the inflowing ammonia amount NH exponentially increases as the degree of richness rises. On the other hand, as shown in FIG. 6(B), the inflowing ammonia amount NH is proportional to the rich time. Accordingly, the inflowing ammonia amount NH, that is, the ammonia amount adsorbed on the $NO_x$ selective reducing catalyst 14, can be estimated from the degree of richness and the rich time.

Figure 7:
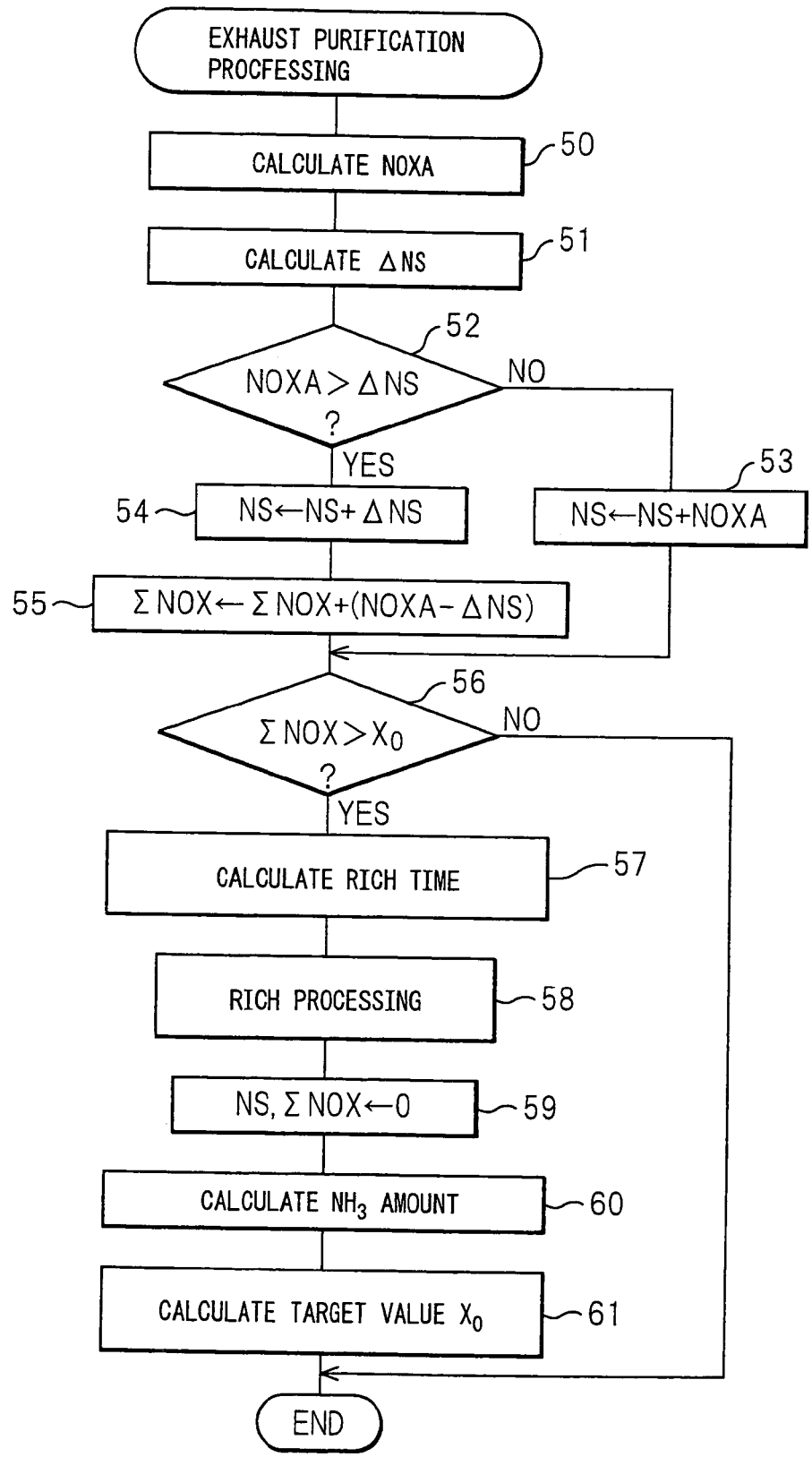
FIG. 7 is a flow chart for carrying out exhaust purification processing.

FIG. 7 shows the exhaust purification processing routine for executing the first embodiment. This routine is executed by interruption every predetermined period. In this first embodiment, the ammonia adsorption amount of the $NO_x$ selective reducing catalyst 14 is estimated, the target value $X_0$ of the $NO_x$ amount necessary to remove this adsorbed ammonia is calculated, and the amount of $NO_x$ according to this target value $X_0$ is fed to the $NO_x$ selective reducing catalyst 14.

Referring to FIG. 7, first, at step 50, the $NO_x$ amount NOXA exhausted per unit time from the engine is calculated from the map shown in FIG. 4(A). Next, at step 51, the $NO_x$ storage rate $\Delta$NS according to the stored $NO_x$ amount NS is calculated from the relationship shown in FIG. 4(B). Next, at step 52, it is judged if the exhausted $NO_x$ amount NOXA is larger than the $NO_x$ storage rate $\Delta$NS. When NOXA>$\Delta$NS, only the part of the exhausted $NO_x$ amount NOXA corresponding to the NOX storage rate $\Delta$NS is stored in the $NO_x$ storing catalyst 12, while the remaining $NO_x$ (NOXA-$\Delta$NS) passes straight through the $NO_x$ storing catalyst 12.

Accordingly, when it is judged at step 52 that NOXA>$\Delta$NS, the routine proceeds to step 54, where the $NO_x$ storage rate $\Delta$NS is added to the stored $NO_x$ amount NS stored in the $NO_x$ storage catalyst 12. Next, at step 55, (NOXA-$\Delta$NS) is added to the total value $\Sigma$NOX of the outflowing $NO_x$ amount passing straight through the $NO_x$ storing catalyst 12 and flowing out from the $NO_x$ storing catalyst 12. Next, the routine proceeds to step 56. On the other hand, when it is judged at step 52 that NOXA$\leqq$$\Delta$NS, the routine proceeds to step 53, where the exhausted $NO_x$ amount NOXA is added to the stored $NO_x$ amount NS, then the routine proceeds to step 56.

At step 56, it is judged if the total value $\Sigma$NOX of the outflowing $NO_x$ amount exceeds the target value $X_0$ necessary to remove the adsorbed ammonia. When the total value $\Sigma$NOX of the outflowing $NO_x$ amount exceeds the target value $X_0$, the routine proceeds to step 57, where the rich time is calculated based on the stored $NO_x$ amount NS at this time, that is, NSX. Next, at step 58, rich processing to make the exhaust gas a rich air-fuel ratio is carried out. Next, at step 59, NS and $\Sigma$NOX are cleared. Next, at step 60, the inflowing ammonia amount NH, that is, the ammonia amount adsorbed on the $NO_x$ selective reducing catalyst 14, is calculated based on the rich time. Next, at step 61, the target value $X_0$ of the outflowing $NO_x$ amount necessary to remove the adsorbed ammonia is calculated.

FIGS. 8(A), (B), and (C) show a number of methods of removing adsorbed ammonia. In FIGS. 8(A), (B), and (C), the left $NO_x$ selective reducing catalyst 14 indicates the state of the adsorbed ammonia just before rich control making the exhaust gas a rich air-fuel ratio, whereas the right $NO_x$ selective reducing catalyst 14 indicates the state of the adsorbed ammonia after rich control. In the example shown in FIG. 8(A), when rich control is carried out, the adsorbed ammonia reaches saturation and all of this adsorbed ammonia is removed just before rich control by the feeding of $NO_x$.

On the other hand, in the example shown in FIG. 8(B), when rich control is carried out, ammonia is adsorbed in a part of the adsorption region of the $NO_x$ selective reducing catalyst 14 and all of this adsorbed ammonia is removed just before rich control by the feeding of $NO_x$. In the example shown in FIG. 8(C), before rich control I and II, the feeding of $NO_x$ for removing ammonia is not carried out, but after the adsorbed ammonia reaches saturation, all of the adsorbed ammonia is removed before rich control III by the feeding of $NO_x$.

Figure 10:
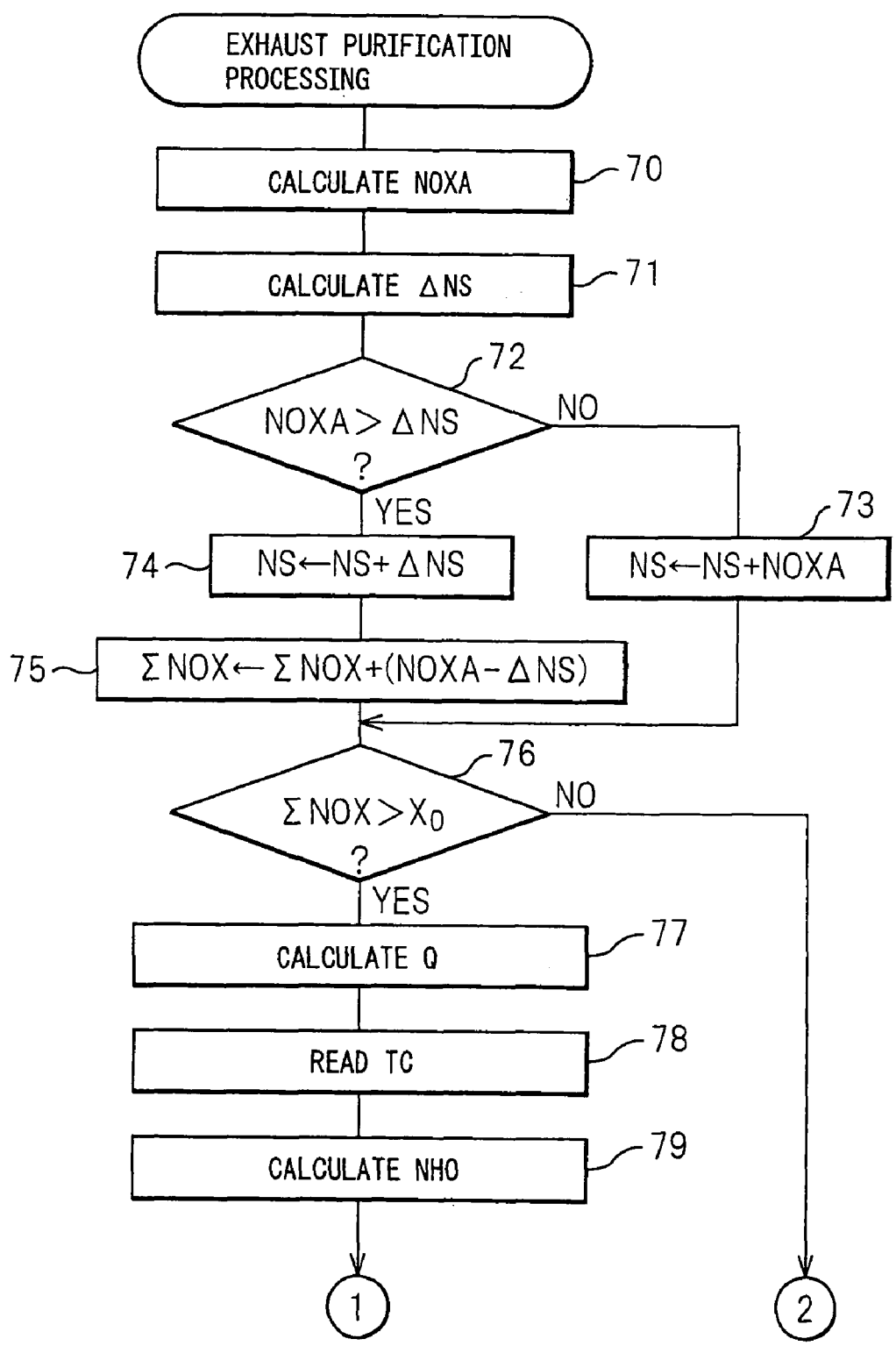
FIG. 10 is a flow chart for carrying out exhaust purification processing.
Figure 11:
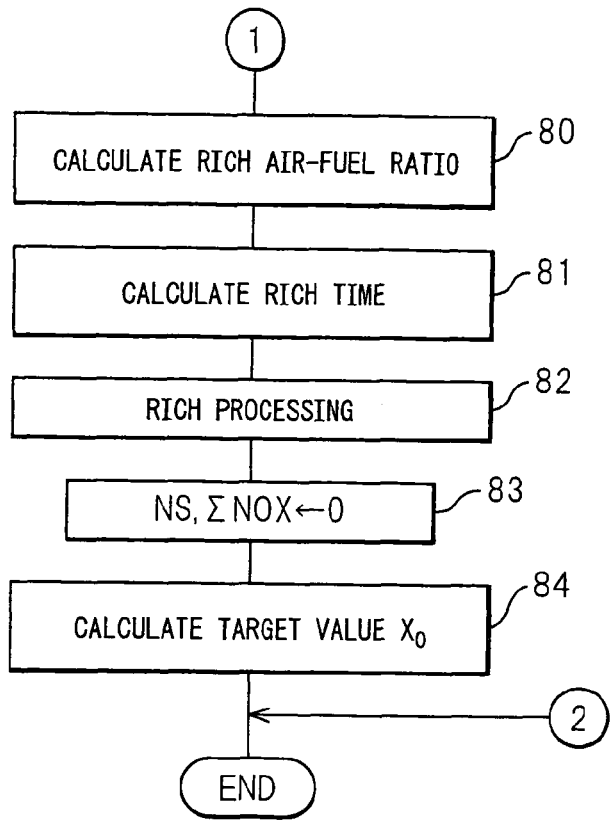
FIG. 11 is a flow chart for carrying out exhaust purification processing.

FIG. 9 to FIG. 11 show a second embodiment keeping the adsorbed ammonia amount of the NO selective reducing catalyst 14 from exceeding the saturated adsorption amount of ammonia. That is, in FIG. 9(A), the solid line MAX indicates the saturated adsorption amount of ammonia of the $NO_x$ selective reducing catalyst 14. This saturated adsorption amount MAX drops as the temperature TC of the $NO_x$ selective reducing catalyst 14 rises.

In this second embodiment, the target ammonia amount NHO to be adsorbed on the $NO_x$ selective reducing catalyst 14 is predetermined. In the example shown in FIG. 9(A), this target ammonia amount NHO is set to be an amount lower than the ammonia saturated adsorption amount MAX of the $NO_x$ selective reducing catalyst 14 by exactly a predetermined amount Z. Accordingly, this target ammonia amount NHO is a function of the catalyst temperature TC. As shown in FIG. 9(A), when the catalyst temperature is $TC_1$, the target ammonia amount becomes $NHO_1$.

In this second embodiment, the ammonia amount generated during rich processing is controlled to the target ammonia amount NHO. Accordingly, in this second embodiment, the adsorbed ammonia amount will not exceed the saturated adsorption amount MAX. However, if the target value is set for the adsorbed ammonia amount in such a way, both the amount Q of the reducing agent for reducing the released $NO_x$ and the amount of generated ammonia must be controlled to the required amounts.

In this regard, as seen from FIG. 5(A), the amount Q of the reducing agent is proportional to the product of the degree of richness and the rich time, while on the other hand, as can be seen from FIGS. 6(A) and (B), even if the reducing agent amount Q is the same, if changing the degree of richness and the rich time, the generated ammonia amount changes. FIG. 9(B) shows the relationship between a number of reducing agent amounts $Q_1$ to $Q_5$, their generated ammonia amounts, that is, the inflowing ammonia amount NH flowing into the $NO_x$ selective reducing catalyst 14, and their degrees of richness. Note that, the amount of reducing agent increases in the order of $Q_1$, $Q_2$, $Q_3$, $Q_4$, and $Q_5$.

As can be seen from FIG. 9(B), increasing the inflowing ammonia amount NH with respect to the same amount of reducing agent will require increasing the degree of richness. If the degree of richness is increased in this case, the rich time is shortened. That is, in this second embodiment, the degree of richness and the rich time of when the air-fuel ratio of the exhaust gas is made rich to release $NO_x$ from the $NO_x$ storing catalyst 12 are controlled to a degree of richness and a rich time capable of finishing the release action of $NO_x$ from the NO$_x$ storing catalyst 12 and of making the adsorbed ammonia amount of the NO$_x$ selective reducing catalyst 14 the target ammonia amount NHO.

FIG. 10 and FIG. 11 show an exhaust purification processing routine for executing the second embodiment. This routine is also executed by interruption every predetermined period.

Referring to FIG. 10 and FIG. 11, first, at step 70, the NO$_x$ amount NOXA exhausted per unit time from the engine is calculated from the map shown in FIG. 4(A). Next, at step 71, the NO$_x$ storage rate ΔNS based on the stored NO$_x$ amount NS is calculated from the relationship shown in FIG. 4(B). Next, at step 72, it is judged if the exhausted NO$_x$ amount NOXA is larger than the NO$_x$ storage rate ΔNS.

When it is judged at step 72 that NOXA>ΔNS, the routine proceeds to step 74, where the NO$_x$ storage rate ΔNS is added to the stored NO$_x$ amount NS stored in the NO$_x$ storing catalyst 12. Next, at step 75, (NOXA-ΔNS) is added to the total value ΣNOX of the outflowing NO$_x$ amount passing straight through the NO$_x$ storing catalyst 12 and flowing out from the NO$_x$ storing catalyst 12. Next, the routine proceeds to step 76. On the other hand, if it is judged at step 72 that NOXA≦ΔNS, the routine proceeds to step 73, where the exhausted NO$_x$ amount NOXA is added to the stored NO$_x$ amount NS, then the routine proceeds to step 76.

At step 76, it is judged if the total value ΣNOX of the outflowing NOX amount exceeds the target value X$_0$ necessary for removing the adsorbed ammonia of the target amount NHO. When the total value ΣNOX of the outflowing NO$_x$ amount exceeds the target value X$_0$, the routine proceeds to step 77, where the amount Q of the reducing agent necessary for reducing the NO$_x$ is calculated based on the stored NOX amount NS at this time, that is, the NSX. Next, at step 78, the catalyst temperature TC detected by the temperature sensor 22 is read, then at step 79, the target ammonia amount NHO based on the catalyst temperature TS is calculated.

Next, at step 80, using the amount Q of the reducing agent and the target ammonia amount NHO, the degree of richness, that is, the rich air-fuel ratio, is calculated from the relationship shown in FIG. 9(B), then, at step 81, the rich time is calculated from the reducing agent amount Q and the degree of richness. Next, at step 82, rich processing making the exhaust gas a rich air-fuel ratio is carried out. Next, at step 83, NS and ΣNOX are cleared. Next, at step 84, the target value X$_0$ of the outflowing NO$_x$ amount that is necessary for removing the adsorbed ammonia of the target amount NH$_0$ is calculated.

Figure 12:
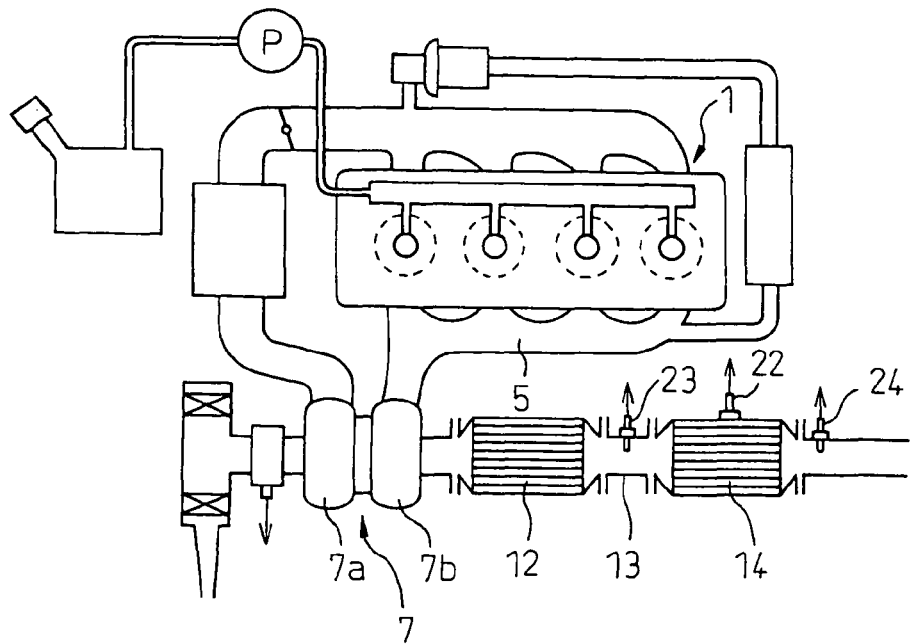
FIG. 12 is an overview showing a different embodiment of a compression ignition type internal combustion engine.

FIG. 12 shows a different embodiment of the compression ignition type internal combustion engine. In this embodiment, upstream and downstream of the NO$_x$ selective reducing catalyst 14, there are provided an NO$_x$ sensor 23 for detecting the concentration of NO$_x$ flowing into the NO$_x$ selective reducing catalyst 14 and an NO$_x$ sensor 24 for detecting the concentration of NO$_x$ flowing out from the NO$_x$ selective reducing catalyst 14. If ammonia is adsorbed on the NO$_x$ selective reducing catalyst 14, the NO$_x$ flowing into the NO$_x$ selective reducing catalyst 14 is reduced by the adsorbed ammonia, whereby the NO$_x$ amount flowing out from the NO$_x$ selective reducing catalyst 14 decreases by exactly the amount that is used to remove the adsorbed ammonia in comparison to the NO$_x$ amount flowing into the NO$_x$ selective reducing catalyst 14.

Accordingly, the adsorbed ammonia amount may be estimated from the difference in the NO$_x$ concentrations before and after the NO selective reducing catalyst 14 detected by the NO$_x$ sensors 23 and 24. Accordingly, instead of estimating the adsorbed ammonia amount from the degree of richness and rich time during rich processing, the adsorbed ammonia may also be estimated from the output values of the pair of NO$_x$ sensors 23 and 24.

Figure 14:
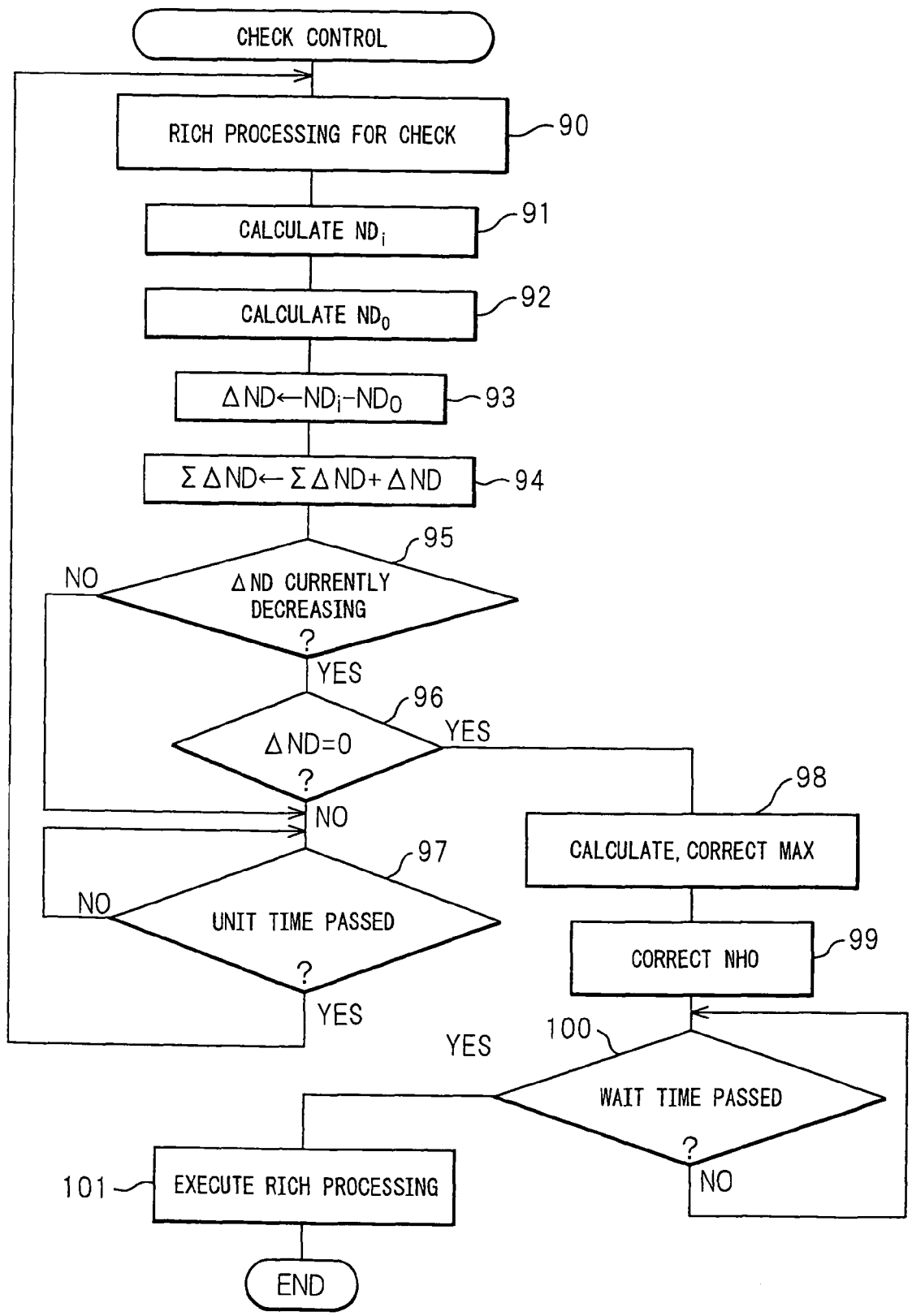
FIG. 14 is a flow chart for carrying out check control checking the saturated adsorption amount of the ammonia.

FIG. 13 and FIG. 14 show an embodiment that detects the ammonia saturated adsorption amount MAX of the NO$_x$ selective reducing catalyst 14 from the difference in the NO$_x$ concentrations before and after the NO selective reducing catalyst 14 detected by the pair of NO$_x$ sensors 23 and 24 and corrects the target ammonia amount NHO based on this ammonia saturated adsorption amount MAX.

That is, in FIG. 13(A), ND$_i$ indicates the inflowing NO$_x$ amount calculated from the output value of the NO$_x$ sensor 23, while ND$_0$ indicates the outflowing NO$_x$ amount calculated from the output value of the NO$_x$ sensor 24. At FIG. 13(A), if rich processing, which is normally carried out at a timing shown by the broken line RS, is ceased, the inflowing NO$_x$ amount ND$_i$ continues to rise, and the outflowing NOX amount ND$_0$ rises rapidly until the inflowing NOX amount ND$_i$ if there is no longer adsorbed ammonia present.

In this case, the area shown by the shaded region in FIG. 13(A) indicates the ammonia adsorption amount, accordingly, the ammonia adsorption amount may be estimated from the output values of the pair of NO$_x$ sensors 23 and 24. However, in this embodiment, in order to make the ammonia adsorption amount of the NO$_x$ selective reducing catalyst 14 reach saturation before detecting the ammonia saturated adsorption amount MAX so as to detect the ammonia saturated adsorption amount MAX, an amount of reducing agent of more than an amount necessary to release NO$_x$ from the NO$_x$ storing catalyst 12 is fed to the NO$_x$ storing catalyst 12. In the example shown in FIG. 13(A), as shown by RF, the air-fuel ratio A/F of the exhaust gas is continuously made rich multiple times.

If a large amount of reducing agent is fed in such a way, the area shown by the shaded region in FIG. 13(A) will indicate the ammonia saturated adsorption amount MAX. If the saturated adsorption amount curve used until now is the broken line curve in FIG. 13(B) and the ammonia saturated adsorption amount, which is detected when the catalyst temperature TC is TC$_1$, is MAX$_1$, the saturated adsorption amount curve is corrected to the solid line saturated adsorption amount curve. The saturated adsorption amount curve is corrected in such a way. If the saturated adsorption amount curve is corrected in such a way, the target ammonia amount NHO is corrected to be lower than the saturated adsorption amount curve by, for example, a predetermined value Z.

FIG. 14 shows the check control routine of the saturated adsorption amount of the ammonia. This check control routine is for example executed only once every time a vehicle is operated.

Referring to FIG. 14, first, at step 90, an instruction to execute a rich processing for check is sent. For example, an instruction making the air-fuel ratio A/F of the exhaust gas rich twice as shown by RF at FIG. 13(A) and prohibiting rich processing shown by the broken line RS is sent.

Next, at step 91, the inflowing NO$_x$ amount ND$_1$ is calculated by multiplying the exhaust gas amount, that is, the intake air amount, with the NO$_x$ concentration detected by the NO$_x$ sensor 23, next, at step 92, the outflowing NO$_x$ amount ND$_0$ is calculated by multiplying the exhaust gas amount, that is, the intake air amount, with the NO$_x$ concentration detected by the NO$_x$ sensor 24. Next, at step 93, the difference ΔND (=ND$_i$−ND$_0$) between the inflowing NO$_x$ amount ND$_i$ and the outflowing NO$_x$ amount ND$_0$ is calculated. Next, at step 94, the difference ΔND is added to the integrated value ΣΔND.

Next, at step 95, it is judged if the difference ΔND is in the process of decreasing. This difference ΔND (=ND$_i$−ND$_0$), as can be seen from FIG. 13(A), is initially zero, but gradually increases, then decreases. When the difference ΔND is not in the process of decreasing, the routine jumps to step 97. At step 97, it is waited until a predetermined unit time passes, then the routine returns to step 90. On the other hand, when it is judged at step 95 that ΔND is in the process of decreasing, the routine proceeds to step 96, where it is judged if the difference ΔND has become zero, that is, it is judged if the calculation of the consumed $NO_x$ amount corresponding to the shaded area in FIG. 13(A) is completed. If the difference ΔND is not zero, the routine proceeds to step 97.

On the other hand, when it is judged at step 96 that the difference ΔND has become zero, that is, when the calculation of the consumed $NO_x$ amount corresponding to the shaded area in FIG. 13(A) is completed, the routine proceeds to step 98, where the ammonia saturated adsorption amount MAX is calculated from the consumed $NO_x$ amount, and the saturated adsorption amount curve is corrected. Next, at step 99, the target ammonia amount NHO is corrected. Next, at step 100, after waiting for exactly a predetermined waiting time, the routine proceeds to step 101. At step 101, rich processing for releasing $NO_x$ shown by the RT in FIG. 13(A) is carried out, then the check control is ended.

List of Reference Numerals
4 . . . intake manifold
5 . . . exhaust manifold
7 . . . exhaust turbocharger
12 . . . $NO_x$ storing catalyst
14 . . . $NO_x$ selective reducing catalyst

The invention claimed is:

1. An exhaust purification device of an internal combustion engine, the exhaust purification device comprising:
   an NOx storing catalyst disposed in an engine exhaust passage and which stores NOx contained in exhaust gas when an air-fuel ratio of an inflowing exhaust gas is lean and releases stored NOx when the air-fuel ratio of the inflowing exhaust gas is a stoichiometric air-fuel ratio or rich;
   an NOx selective reducing catalyst disposed in the engine exhaust passage downstream of the NOx storing catalyst, the NOx selective reducing catalyst able to selectively reduce NOx in the exhaust gas with adsorbed ammonia; and
   an electronic control unit configured to control the air-fuel ratio of the exhaust gas flowing into the NOx storing catalyst to be temporarily switched from lean to rich to release NOx from the NOx storing catalyst, the electronic control unit configured to calculate an amount of NOx passing straight through the NOx storing catalyst under a lean air-fuel ratio of the exhaust gas, and when a calculated NOx amount reaches a predetermined threshold sufficient to remove a predetermined amount of ammonia adsorbed on the NOx selective reducing catalyst, the electronic control unit temporarily switches the air-fuel ratio of the exhaust gas from lean to rich,
   wherein the electronic control unit is configured to perform an ammonia removal control by which ammonia adsorbed on the NOx selective reducing catalyst is removed from the NOx selective reducing catalyst by feeding the predetermined threshold amount of NOx before the air-fuel ratio of the exhaust gas flowing into the NOx storing catalyst is temporarily switched from lean to rich.

2. An exhaust purification device as claimed in claim 1, wherein the electronic control unit is configured to estimate an ammonia amount adsorbed on the NOx selective reducing catalyst, and control the feeding of the amount of NOx sufficient to remove all or a portion of the estimated adsorbed ammonia amount to the NOx selective reducing catalyst while under a lean air-fuel ratio of the exhaust gas.

3. An exhaust purification device as claimed in claim 2, wherein the electronic control unit estimates the adsorbed ammonia amount based on a degree of richness and a rich time when the air-fuel ratio of the exhaust gas is made rich to release NOx from the NOx storing catalyst.

4. An exhaust purification device as claimed in claim 2, further comprising:
   a first NOx sensor for detecting a concentration of NOx flowing into the NOx selective reducing catalyst; and
   a second NOx sensor for detecting a concentration of NOx flowing out from the NOx selective reducing catalyst,
   wherein the electronic control unit estimates the adsorbed ammonia amount from a difference in the NOx concentration before and after the NOx selective reducing catalyst detected by the first and second NOx sensors.

5. An exhaust purification device as claimed in claim 1, wherein the electronic control unit sets a target ammonia amount to be adsorbed on the NOx selective reducing catalyst in advance, and controls a degree of richness and a rich time when the air-fuel ratio of the exhaust gas is made rich to release NOx from the NOx storing catalyst to a degree of richness and a rich time capable of completing a release action of NOx from the NOx storing catalyst and of making the adsorbed ammonia amount of the NOx selective reducing catalyst become the target ammonia amount.

6. An exhaust purification device as claimed in claim 5, wherein the target ammonia amount is set to a lower amount than an ammonia saturated adsorption amount of the NOx selective reducing catalyst.

7. An exhaust purification device as claimed in claim 6, further comprising:
   a first NOx sensor for detecting a concentration of NOx flowing into the NOx selective reducing catalyst; and
   a second NOx sensor for detecting a concentration of NOx flowing out from the NOx selective reducing catalyst,
   wherein the electronic control unit is configured to correct the target ammonia amount based on the ammonia saturated adsorption amount of the NOx selective reducing catalyst detected from a difference of the NOx concentrations before and after the NOx selective reducing catalyst detected by the first and second NOx sensors.

8. An exhaust purification device as claimed in claim 7, wherein the electronic control unit is configured to control feeding of an amount of reducing agent more than an amount necessary for releasing NOx from the NOx storing catalyst to the NOx storing catalyst to make the ammonia adsorption amount of the NOx selective reducing catalyst reach saturation before a detection of the ammonia saturated adsorption amount.

* * * * *